United States Patent
Ramasamy et al.

(10) Patent No.: US 11,314,579 B2
(45) Date of Patent: Apr. 26, 2022

(54) APPLICATION PROTECTION FROM BIT-FLIP EFFECTS

(71) Applicant: International Business Machines Corporation, Armonk, NY (US)

(72) Inventors: HariGovind Venkatraj Ramasamy, Round Rock, TX (US); John B. Carter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 16/558,545

(22) Filed: Sep. 3, 2019

(65) Prior Publication Data

US 2021/0064459 A1 Mar. 4, 2021

(51) Int. Cl.
*G06F 11/00* (2006.01)
*G06F 11/07* (2006.01)
*G06N 5/04* (2006.01)
*H04L 67/10* (2022.01)
*G06F 11/20* (2006.01)

(52) U.S. Cl.
CPC ...... *G06F 11/0793* (2013.01); *G06F 11/0709* (2013.01); *G06F 11/079* (2013.01); *G06F 11/0751* (2013.01); *G06F 11/203* (2013.01); *G06N 5/04* (2013.01); *H04L 67/10* (2013.01)

(58) Field of Classification Search
CPC ............. G06F 11/0793; G06F 11/0709; G06F 11/0751; G06F 11/079; G06F 11/203; G06N 5/04; H04L 67/10
See application file for complete search history.

(56) References Cited

U.S. PATENT DOCUMENTS

| | | | | |
|---|---|---|---|---|
| 8,650,431 | B2* | 2/2014 | Floyd | G06F 11/2043 714/3 |
| 2012/0054544 | A1* | 3/2012 | Floyd | G06F 11/2043 714/6.32 |
| 2016/0257429 | A1* | 9/2016 | Szeto | G05B 23/0235 |
| 2017/0046218 | A1 | 2/2017 | Krishnappa et al. | |
| 2017/0116091 | A1* | 4/2017 | Anderson | H04L 41/0806 |
| 2017/0277441 | A1 | 9/2017 | Gupta et al. | |
| 2017/0364709 | A1 | 12/2017 | Plusquellic | |
| 2018/0307434 | A1 | 10/2018 | Bittiestone | |

(Continued)

OTHER PUBLICATIONS

Bronevetsky et al., "A Foundation for the Accurate Prediction of the Soft Error Vulnerability of Scientific Applications," https://e-reports-ext.llnl.gov/pdf/370055.pdf, LLNL-CONF-410635, Lawrence Livermore National Laboratory, Feb. 18, 2019, 6 pgs.

(Continued)

*Primary Examiner* — Jonathan D Gibson
(74) *Attorney, Agent, or Firm* — Jared L. Montanaro

(57) ABSTRACT

A processor may receive information about one or more environmental factors. The processor may predict, based on the one or more environmental factors, that a particular datacenter in a distributed computing environment will experience elevated bit-flip error rates during a certain time period. The processor may select, based on the predicted elevated bit-flip error rates, one or more specific applications in the particular datacenter to be protected. The processor may protect the selected one or more specific applications during the certain time period of the predicted elevated bit-flip rates.

18 Claims, 6 Drawing Sheets

(56) References Cited

U.S. PATENT DOCUMENTS

2019/0235970 A1\* 8/2019 Mishra .................... G06F 3/067
2021/0064459 A1\* 3/2021 Ramasamy ......... G06F 11/0751

OTHER PUBLICATIONS

Field, S., "Microsoft Azure uses Error-Correcting Code memory for enhanced reliability and security," https://azure.microsoft.com/en-us/blog/microsoft-azure-uses-error-correcting-code-memory-for-enhanced-reliability-and-security/, printed Jun. 11, 19, 3 pgs.

Kolditz et al., "AHEAD: Adaptable Data Hardening for On-the-Fly Hardware Error Detection during Database Query Processing," Research 15: Databases for Emerging Hardware, SIGMOD '18, Jun. 10-15, 2018, pp. 1619-1634.

Kong, et al., "Fault Propagation Analysis in Software Intensive Systems: A Survey," 2017 Second International Conference on Reliability Systems Engineering (ICRSE), 9 pgs.

Mukherjee et al., "A Systematic Methodology to Compute the Architectural Vulnerability Factors for a High-Performance Microprocessor," https://people.csail.mit.edu/emer/papers/2003.12.micro.avf.pdf, Proceedings of the 36th Annual International Symposium on Mcroarchitecture (MICRO), Dec. 2003, 12 pgs.

Nikiforakis, et al., "Bitsquatting: Exploiting Bit-flips for Fun, or Profit?" WWW 2013, May 13, 2017, © International World Wide Web Conference Committee (IW3C2), pp. 989-998.

Nowicki et al., "OPINION / A slow neutron beats a flipping fast bit," https://www.abqjournal.com/1149465/a-slow-neutron-beats-a-flipping-fast-bit-ex-bombardment-from-space-may-slow-or-stop-our-digital-world.html, Mar. 23, 2018, printed Jun. 11, 19, 2 pgs.

Razavi et al., "Flip Feng Shui: Hammering a Needle in the Software Stack," https://www.usenix.org/conference/usenixsecurity16/technical-sessions/p, printed Jun. 11, 2019, 1 pg.

Shivakumar et al., "Modeling the Effect of Technology Trends on the Soft Error Rate of Combinational Logic," https://ieeexplore.ieee.org/document/1028924, Proceedings of the International Conference on Dependable Systems and Networks (DSN'02), © 2002 IEEE, 10 pgs.

Sridharan et al., "Memory Errors in Modem Systems, The Good, The Bad, and the Ugly," tps://www.cs.virginia.edu/~gurumurthi/papers/asplos15.pdf, ASPLOS '15, Mar. 14-18, 2015, 2015 ACM, 14 pgs.

Thomm et al., "Automated Application of Fault Tolerance Mechanisms in a Component-Based System," JTRES Sep. 26-28, 2011, © 2011 ACM 978-1-4503-0731-4l/11/09, 9 pgs.

Unknown, "Amazon S3 Availability Event: Jul. 20, 2008," https://status.aws.amazon.com/s3-20080720.html, printed Mar. 11, 2019, 1 pg.

Unknown, "Cisco Bug: CSCuz62750—Incremental drops on counter DROP_FRM_CRC_ERR_SGMIIo causes traffic loss," https://quickview.cloudapps.cisco.com/quickview/bug/CSCuz62750, last modified May 2, 2019, printed Mar. 11, 2019, 1 pg.

Wikipedia, "Electronic voting in Belgium—Wikipedia," https://en.wikipedia.org/wiki/Electronic_voting_in_Belgium, printed Jun. 11, 2019, 1 pg.

Xiao et al., "One Bit Flips, One Cloud Flops: Cross-VM Row Hammer Attacks and Privilege Escalation," https://www.usenix.org/conference/usenixsecurity16/technical-sessions/presentation/xiao, printed Jun. 11, 2019, 1 pg.

Mell et al., "The NIST Definition of Cloud Computing," Recommendations of the National Institute of Standards and Technology, U.S. Department of Commerce, Special Publication 800-145, Sep. 2011, 7 pgs.

\* cited by examiner

APPLICATION PROTECTION FROM BIT-FLIP EFFECTS

BACKGROUND

The present disclosure relates generally to the field of distributed computing environments, and more specifically to protecting applications from the effects of bit-flips in a distributed computing environment.

Bit-flips, also called single event upsets, can lead to a variety of system errors, some of which can result in service/machine failures or security violations (e.g., unauthorized access, data leakage, etc.). Bit-flips may be caused by cosmic ray neutrons that are present at any given location on the earth's surface. A tiny fraction of neutrons hitting a CPU may end up striking the nuclei of atoms in the CPU, particularly if those neutrons are very high-energy neutrons. If the neutron ends up displacing the nucleus, then a bit-flip may occur, leading to data corruption. In supercomputers, datacenters, and cloud hosting centers, these bit-flips are more likely to happen because of the high concentration of CPUs in a relatively small area.

SUMMARY

Embodiments of the present disclosure include a method, computer program product, and system for protecting applications from the effects of bit-flips in a distributed computing environment. A processor may receive information about one or more environmental factors. The processor may predict, based on the one or more environmental factors, that a particular datacenter in a distributed computing environment will experience elevated bit-flip error rates during a certain time period. The processor may select, based on the predicted elevated bit-flip error rates, one or more specific applications in the particular datacenter to be protected. The processor may protect the selected one or more specific applications during the certain time period of the predicted elevated bit-flip rates.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
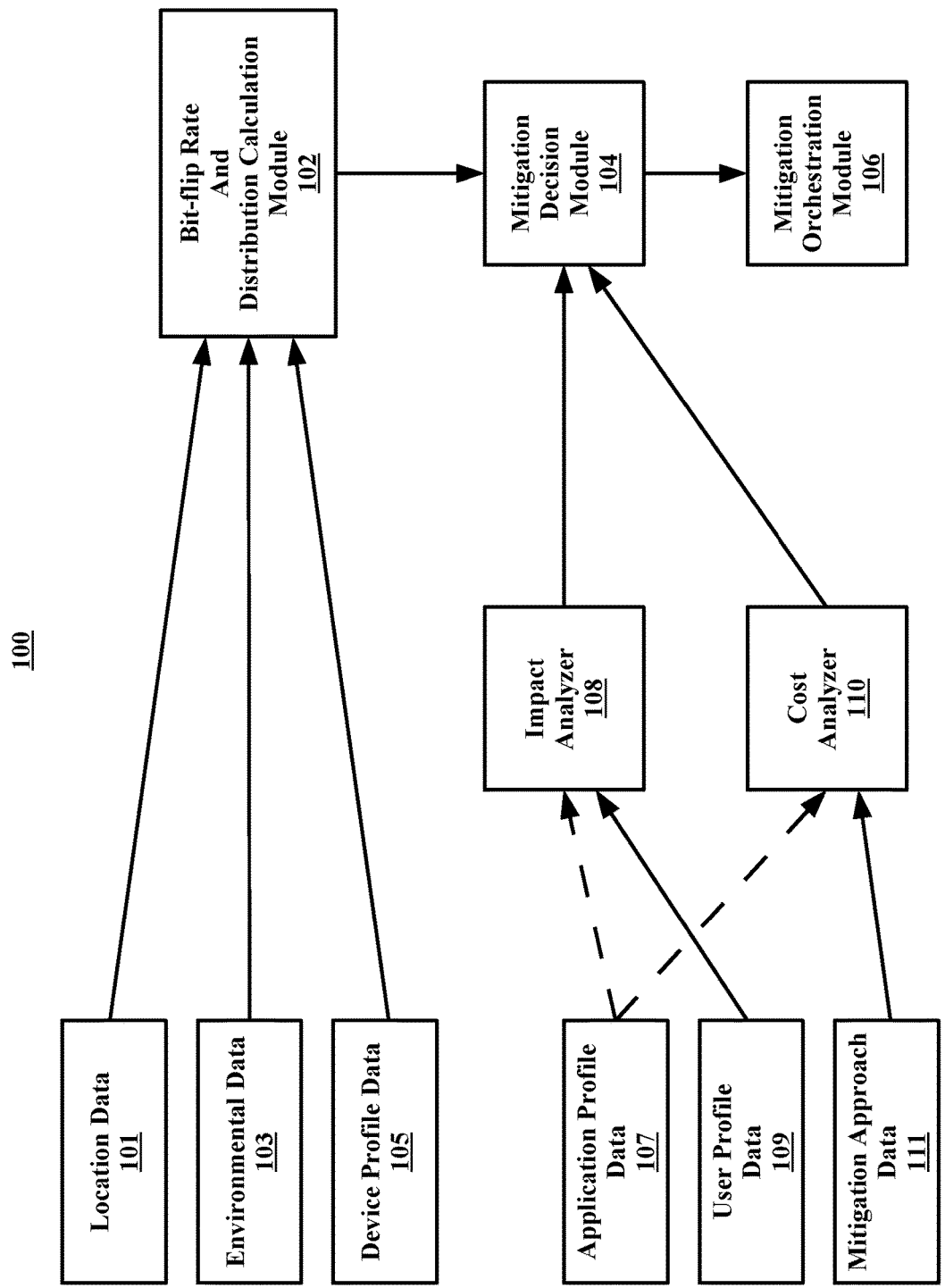
FIG. 1 illustrates an example system for broadly determining a mitigation strategy for protecting an application from the effects of bit-flips, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of distributed computing environments, and more specifically to protecting applications from the effects of bit-flips in a distributed computing environment. While the present disclosure is not necessarily limited to such applications, various aspects of the disclosure may be appreciated through a discussion of various examples using this context.

Due to a high concentration of central processing units (CPUs) in a relatively small area within supercomputers, datacenters, and/or cloud hosting centers, there are increased chances for data corruption and/or soft errors due to bit-flips caused by cosmic ray neutrons, Row Hammer, RAMBleed, etc. Examples of such data corruption has been documented and ranges from a virtual machine owned by an adversary getting access to co-located virtual machines by bit-flipping the public key of an administrator for a second virtual machine, to a single bit corruption leading to the outage of an entire global cloud service. With such damaging consequences being a realistic threat to cloud service providers there is a need to protect mission-critical, business-critical, and essential applications from the potentially harmful effects of bit-flips in a cloud or hosting environment (e.g., distributed computing environment).

Accordingly, a processor (e.g., in cloud environment, hosting environment, distributed computing environment, etc.) may receive information about one or more environmental factors. It is noted that the processor described herein, in regard to this disclosure can be any processor that can utilize the disclosed method, system, and/or computer program product. Said processors can be, but are not limited to decision engines and/or controllers that provide the ability to perform the embodiments of the present disclosure. The processor may predict, based on the one or more environmental factors, that a particular datacenter in a distributed computing environment will experience elevated bit-flip error rates during a certain time period. The processor may select, based on the predicted elevated bit-flip error rates, one or more specific applications in the particular datacenter to be protected (e.g., secured, shielded, etc.). The processor may protect (e.g., secure, shield, etc.) the selected one or more specific applications during the certain time period of the predicted elevated bit-flip error rates.

For example, a controller for a cloud computing environment may identify that one of the datacenters the controller is managing is located in Denver, Colo., which has an elevation of 1,609.3 meters (5,280 feet). The controller may additionally identify, from municipal sources (e.g., environmental websites, weather channels, etc.), that solar flares will be abnormally active between 1:00 p.m. and 3:00 p.m. on a particular day. The controller may predict that because of the datacenter's high elevation, the datacenter is more likely to be affected by the solar flares on that particular day. The controller may then scan the datacenter for the usage of all of its hosted applications. The controller may identify that the most prolific application hosted at the datacenter is an image sharing application that is owned by the datacenter's best customer. The controller may then protect the image sharing application by automatically copying the image sharing application to a second datacenter.

This may be done in case the solar flares cause bit-flip errors at the original datacenter and the image sharing application at the original datacenter is corrupted. In some embodiments, after the time period of concern on the particular day (e.g., 1:00 p.m. to 3:00 p.m.), the controller may determine whether or not the application at the original datacenter is corrupted, and if it is not, then the controller may delete the copy from the second datacenter.

In some embodiments, the one or more environmental factors include elevation, excessive temperatures, voltage spikes, and solar flares. Following the example above, the controller may also take into account if the solar flares are likely to affect electronics controlling the datacenter's heating, ventilation, and air conditioning (HVAC) system (e.g., fans, dampers, air-conditioning, etc.) because if the datacenter becomes too hot (e.g., excessive temperatures) the servers could malfunction. Said another way, the controller may take into account more than one environmental factor and may account for how the one or more environmental factors interact with one another (e.g., a thunderstorm could cause a voltage spike which could surge to servers and damage them, etc.).

In some embodiments, the one or more specific applications are selected to be moved based on a determined threshold level of the predicted elevated bit-flip error rates being exceeded. For example, a program installed on a computer in a datacenter may identify from news alerts and other various sources that a wildfire (e.g., which is non-bit flip threat, but can cause excessive heat that would lead to such an error) is 20 miles from the location of the datacenter. The program may, on a scale of 1 to 10, rank the information of having a wildfire 20 miles from the location of the datacenter as a 5, which indicates that the information should be reviewed (e.g., either constantly or at periodic intervals) until the fire is extinguished or for information on if it is getting closer to the datacenter.

The program may be preprogrammed to protect applications/data/information at the datacenter if the ranking ever meets or exceeds an 8, indicating that a bit-flip issue is likely to occur. The program may then identify that winds are blowing in the direction of the datacenter and that the wildfire is likely to get within 10 miles of the datacenter within the next hour. The program may then increase the ranking to a 9 and begin to automatically protect the applications/data/information at the datacenter.

In some embodiments, the one or more specific applications are selected to be moved based on respective bit-flip tolerances of each of the one or more specific applications. The selected one or more specific applications are identified as having a bit-flip error tolerance below a tolerance threshold. For example, a controller of a datacenter, on a 0% to 100% tolerance scale (where a 0% tolerance indicates that the application will be completely destroyed by a bit-flip error and a 100% tolerance indicates that the application has the resilience to survive a bit-flip error), may protect (e.g., by moving, migrating, replicating, etc.) applications during a predicted, high bit-flip occurrence if the applications have a tolerance below 35%.

For example, the controller may first identify a password-generation application housed at the datacenter and the controller may identify that the password-generation application is only active once a day when it creates a new daily password for a user. The controller may give the password-generation application a tolerance of 85% as it is likely that a bit-flip error would not occur during the password-generation application's active time, and even if it did, the password-generation application could generate a new daily password. This may be in contrast to a metric-recording application that constantly records information. The controller may give the metric-recording application a tolerance of 10% because if a bit-flip error occurs all of the recorded data could be lost and never recovered.

In some embodiments, the one or more specific applications are selected to be protected based on a priority level automatically set by the particular datacenter. The priority level may be associated with a user input. The user input may indicate a preference for each of the one or more specific applications. In some embodiments, priority level determines in which order applications are protected.

For example, before utilizing a datacenter for their needs, a user may indicate the importance of their applications. The user may indicate that a primary application is to be protected from error at all times as it is what all the user's secondary applications operate from. The datacenter may then automatically change a predicted elevated bit-flip error threshold for the primary application to ensure that it is protected/secured at all times. That is, the datacenter could prioritize the main application by saying if the predicted bit-flip errors meet or exceed 1, on a scale of 1 to 10, that the main application should be replicated to other locations within the datacenter (or other datacenters of a cloud computing environment, etc.). Whereas, all the other applications may only be moved if predicted bit-flip errors meet or exceed 9 on the scale of 1 to 10.

In some embodiments, protecting the selected one or more specific applications may include the processor identifying a second datacenter in the distributed computing environment. The second datacenter may be determined to have a lower bit-flip error rate during the certain time period. The processor may transfer the selected one or more specific applications to the second datacenter, instead of merely copying them to the second datacenter. Then the processor may receive the selected one or more specific applications back from the second datacenter after the certain time period.

For example, a datacenter in Phoenix, Ariz. may be expected to go through a heatwave for two days and the datacenter may determine that an application should be protected from any possibility of the excessive heat interrupting the datacenter. The datacenter may then communicate (e.g., via the cloud, networked communications, etc.) with a second datacenter in Minneapolis, Minn., which will not be going through a heatwave, and transfer the application to the second datacenter for the duration of the heatwave in Phoenix. After the heatwave, the second datacenter may transfer the application back to the original datacenter. In some embodiments, the application is not migrated/transferred to the second datacenter, but instead the application is copied/replicated/duplicated and the copy/replica/duplicate is sent to the second datacenter as a back-up of the application, as discussed below in more detail.

In some embodiments, protecting the selected one or more specific applications may include the processor replicating each of the selected one or more specific applications. The selected one or more specific applications being replicated may be classified as originals. The processor may store each of the replicas in a different location within the particular datacenter (or distributed computing environment). The processor may generate an indication of the locations of each of the replicas. The processor may select, after the certain time period, an uncorrupted version of the one or more specific applications from the originals and the replicas. The processor may delete the unselected originals and replicas from the particular datacenter.

For example, a datacenter may predict that a bit-flip error incident is 80% likely to happen and that an application should be protected from the likely incident. The datacenter may then generate four copies of the application (e.g., the original application and the four copies for a total of five applications) and store each copy in a different location within the datacenter (e.g., on another server, in a different node within the same server, etc.). The datacenter may additionally note the location of each copy and keep the original application in its current location (however, in some embodiments, the original application could be moved as well).

The datacenter may then identify that the time for the incident has passed and examine the original application and the copies. The datacenter may identify that the original application and one copy were corrupted by the incident. The datacenter may discard/delete the original application and the corrupted copy and replace the original application with one of the three remaining uncorrupted copies. The selected copy may be placed in the same location as the original application. The datacenter may then delete the remaining two unselected copies.

Referring now to FIG. 1, illustrated is an example system 100 for broadly determining a mitigation strategy for protecting an application from the effects of bit-flips, in accordance with embodiments of the present disclosure. In some embodiments, the system 100 can include location data 101, environmental data 103, device profile data 105, application profile data 107, user profile data 109, and mitigation approach data 111. In some embodiments, data 101, 103, 105, 107, 109, and 111 can be found from external sources (e.g., websites, municipalities, etc.) and/or from internal sources (e.g., profile databases stored in the system, etc.).

In some embodiments, the system 100 can further include a bit-flip rate and distribution calculation module 102, a mitigation decision module 104, a mitigation orchestration module 106, an impact analyzer 108, and a cost analyzer 110.

In an overarching sense, the system 100 can be set to describe the enumerated steps: one step can involve predicting, or detecting, situations (e.g., incidences, conditions, circumstances, etc.) where applications running in a particular data center, cloud environment, or distributed computing environment are likely to experience higher-than-normal bit-flip error rates.

Another step determines which applications running in the impacted data center, etc. should have bit-flip remediation (e.g., protection) actions applied during such situations. For this purpose, the disclosed system 100 can use a mechanism for predicting, or determining, the potential impact of bit-flip on individual applications and the (processing, computing, economic, etc.) cost/value of mitigating bit-flips.

The final step involves applying one or more of the appropriate remediations (to negate the impact of errors caused by bit-flip errors) for each of the applications identified in the previous step.

Following the steps described above, the bit-flip rate and distribution calculation module 102 can receive (or accesses) the location data 101, the environmental data 103, and the device profile data 105. From the location data 101, the bit-flip rate and distribution calculation module 102 can identify the geographic/physical location of the system 100. From the environmental data 103, the bit-flip rate and distribution calculation module 102 can identify information relating to the location data 101 (e.g., humidity of the region, incoming thunderstorms, solar eclipses, solar storms, time, etc.). It is noted that in some embodiments the environmental data 103 can include the location data 101. From the device profile data 105, the bit-flip rate and distribution calculation module 102 can identify what type of (and/or how many) device or devices the system 100 utilizes (e.g., one hundred application servers, two connected gaming computers, etc.).

From ingesting and analyzing the location data 101, environmental data 103, and the device profile data 105, the bit-flip rate and distribution calculation module 102 can predict/determine the probability/likelihood of a bit-flip error to occur in the system 100 at a particular time. The bit-flip rate and distribution calculation module 102 can then send the predicted probability to the mitigation decision module 104.

In some embodiments, the impact analyzer 108 can receive the application profile data 107 and the user profile data 109. From the application profile data 107, the impact analyzer 108 can identify what type of applications are housed in the system 100 and which applications would be most affected by bit-flips. From the user profile data 109, the impact analyzer can rank each of the applications based on a user's preference for each application. In some embodiments, the impact analyzer 108 can rank each of the applications in the system 100, based on the application profile data 107 in conjunction with the user profile data 109, and can determine an impact level (e.g., threshold bit-flip level) to keep the system 100 at and then the impact analyzer 108 can send the ranks (e.g., ranked list of applications) and impact level to the mitigation decision module 104.

In some embodiments, the cost analyzer 110 can receive the application profile data 107 and the mitigation approach data 111. From the application profile data 107, the cost analyzer 108 can identify what type of applications are housed in the system 100 and which applications would cost (e.g., computing-wise, economically, processing-wise, etc.) the system 100 the most to restore in the case of bit-flip errors.

From the mitigation approach data 111, the cost analyzer 110 can identify each of the protection/security/mitigation actions that could be taken to mitigate or prevent the loss or destruction of the applications due to bit-flips and the costs associated with each protection action (e.g., migrating the applications to a new location in the system 100, migrating the applications to a new system, shutting the system 100 down for the certain period of time, etc.).

In some embodiments, the protection actions (e.g., mitigation approaches/strategies) of the mitigation approach data 111 can be selected from a static library of protection actions that are preprogramed into the system 100. That is, the system 100 has preprogrammed protection actions for specific types of applications. For example, if the highest priority application is a social media application with millions of users, the protection approach is to replicate the application onto two or more other systems.

In some embodiments, the protection actions of the mitigation approach data 111 can be selected via a machine learning aspect of the system 100. For instance, the system 100 may have been preprogrammed with a base set of protection actions, such as, "move applications to new servers" and "go into hibernate mode." However, in a previous instance of utilizing a protection action, such as going into hibernate mode during a thunderstorm and having a voltage surge damage part of the system 100, the system 100 may now know to not utilize hibernate mode during thunderstorms and may now opt to completely shut down.

In some embodiments, the cost analyzer 110, based on the application profile data 107 and the mitigation approach data 111, can determine a cost effective mitigation strategy to utilize to prevent/mitigate bit-flips and the cost analyzer 110 can send the determination to the mitigation decision module 104.

In some embodiments, after receiving the outputs from the bit-flip rate and distribution calculation module 102, the impact analyzer 108, and the cost analyzer 110, the mitigation decision module 104 can determine if there is a need to initiate a mitigation protocol (e.g., has a bit-flip probability threshold been met or exceeded?). If the mitigation decision module 104 determines that a mitigation protocol should not be initiated, the system 100 can periodically (or continuously) restart the steps described here for FIG. 1.

If the mitigation decision module 104 determines that a mitigation protocol should be initiated, the mitigation decision module 104 can send the ranked list (e.g., priority) of applications to be protected (e.g., based on the bit-flip tolerance as previously discussed above) and the mitigation strategy (protection protocol) to the mitigation orchestration module 106. Upon receiving the information from the mitigation decision module 104, the mitigation orchestration module 106 can enact the mitigation strategy to protect the selected applications in the system 100.

Figure 2:
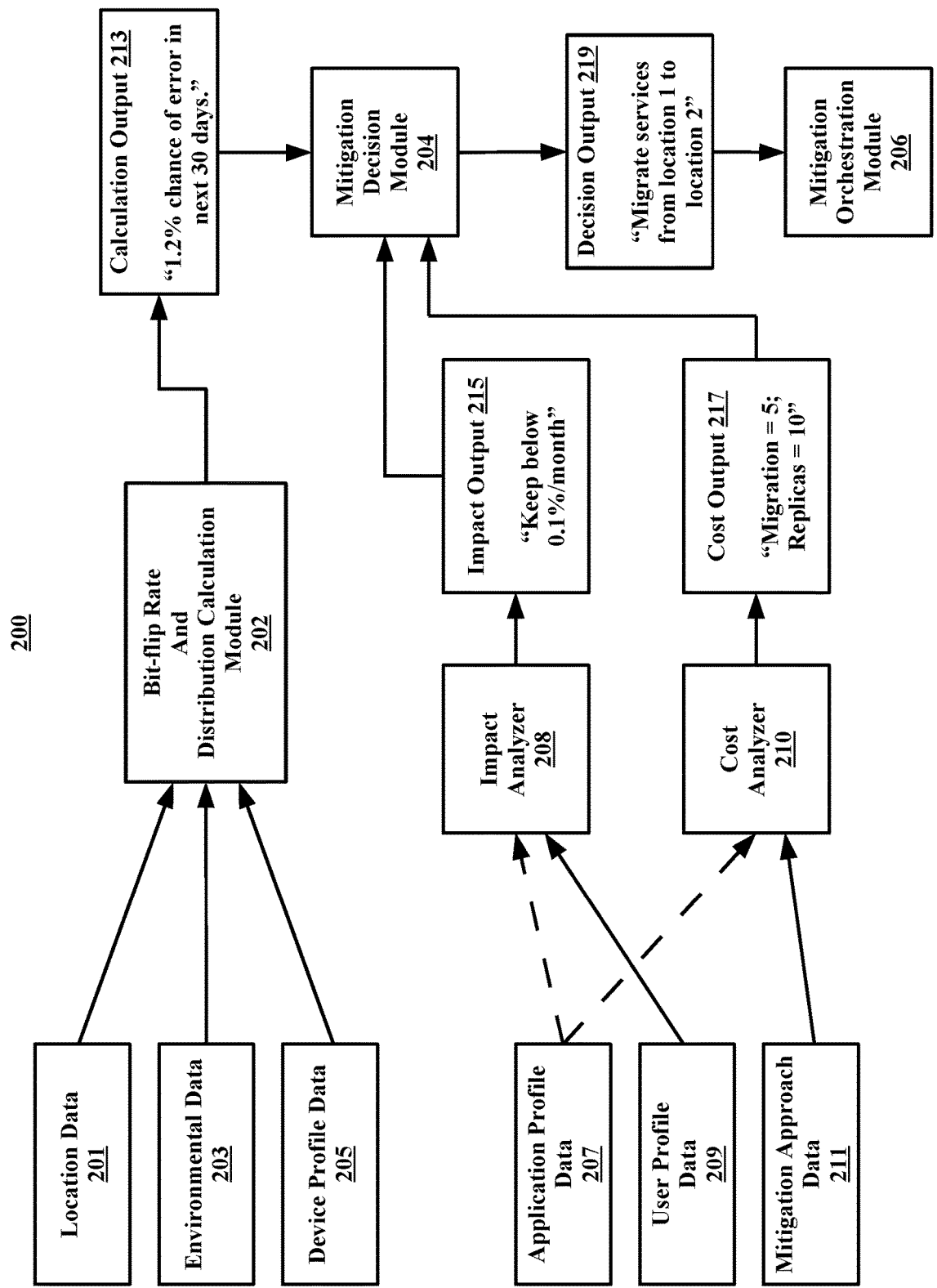
FIG. 2 illustrates an example system for determining a mitigation strategy for protecting a specific application from the effects of bit-flips, in accordance with embodiments of the present disclosure.

Referring now to FIG. 2, illustrated is an example system 200 for determining a mitigation strategy for protecting a specific application from the effects of bit-flips, in accordance with embodiments of the present disclosure. In some embodiments, the system 200 may be the same system or substantially the same system as the system 100, as described above in regard to FIG. 1.

In some embodiments, the system 200 includes location data 201, environmental data 203, device profile data 205, application profile data 207, user profile data 209, and mitigation approach data 211. In some embodiments, the data 201, 203, 205, 207, 209, and 211 can be found from external sources (e.g., websites, municipalities, etc.) and/or from internal sources (e.g., profile databases stored in the system, etc.).

In some embodiments, the system 200 further includes a bit-flip rate and distribution calculation module 202, a mitigation decision module 204, a mitigation orchestration module 206, an impact analyzer 208, a cost analyzer 210, a calculation output 213, an impact output 215, a cost output 217, and a decision output 219.

In some embodiments, the bit-flip rate and distribution calculation module 202 can receive (or access) the location data 201, the environmental data 203, and the device profile data 205. From the location data 201, the bit-flip rate and distribution calculation module 202 can identify the geographic/physical location (e.g., Boulder, Colo.) of the system 200. From the environmental data 203, the bit-flip rate and distribution calculation module 202 can identify information relating to the location data 201 (e.g., elevation, humidity of the region, incoming thunderstorms, solar eclipses, solar storms, time, etc.). It is noted that in some embodiments that the environmental data 203 includes the location data 201. From the device profile data 205, the bit-flip rate and distribution calculation module 202 can identify what type of (and/or number of) device or devices the system 200 utilizes (e.g., two hundred mail servers, two connected supercomputers, etc.).

From ingesting and analyzing the location data 201, environmental data 203, and the device profile data 205, the bit-flip rate and distribution calculation module 202 can predict/determine the probability/likelihood of a bit-flip error to occur in the system 200 at a particular time. The prediction of the probability can be output by the bit-flip rate and distribution calculation module 202 as the calculation output 213, which for this example indicates that the system 200 that is located in Boulder, Colo. has a "1.2% chance of a bit-flip error in the next 30 days." The calculation output 213 of the bit-flip rate and distribution calculation module 202 can then be sent to the mitigation decision module 204.

In some embodiments, the impact analyzer 208 can receive the application profile data 207 and the user profile data 209. From the application profile data 207, the impact analyzer 208 can identify what type of applications are housed in the system 200 and which applications would be most affected by bit-flips. From the user profile data 209, the impact analyzer can rank each of the applications based on a user's preference for each application. In some embodiments, the impact analyzer 208 can rank each of the applications in the system 200, based on the application profile data 207 in conjunction with the user profile data 209, and determine an impact level (e.g., threshold bit-flip level) to keep the system 200 at or below. The impact analyzer 208 can output the impact level as the impact output 215, which for this example, indicates that the system 200 should have a predicted impact level kept "below 0.1%/month." In some embodiments, the impact output 215 includes the ranked list of applications to be protected by not reaching the impact level (e.g., 0.1%/month). The impact output 215 can then be sent to the mitigation decision module 104.

In some embodiments, the cost analyzer 210 can receive the application profile data 207 and the mitigation approach data 211. From the application profile data 207, the cost analyzer 210 can identify what type of applications are housed in the system 200 and which applications would cost (e.g., computing-wise, economically, processing-wise, etc.) the system 200 the most to restore in the case of bit-flip errors. From the mitigation approach data 211, the cost analyzer 210 can identify protection actions that could be taken to mitigate or prevent the loss or destruction of the applications due to bit-flips and the costs associated with the protection actions (e.g., migrating the applications to a new location in the system 200, migrating the applications to a new system, shutting the system 200 down for the certain period of time, etc.).

In some embodiments, the cost analyzer 210, based on the application profile data 207 and the mitigation approach data 211, can determine the cost effectiveness of mitigation strategies that could be utilized to prevent/mitigate bit-flips and can output the mitigation strategies as the cost output 217, which on a scale of 1 to 10, where 1 means a low cost associated with the strategy and 10 means a high cost associated with the strategy, indicates that "migration=5 [and] replicas=10." The cost output 217 can then be sent to the mitigation decision module 204 where the mitigation decision module 204 can analyze the mitigation strategies and their associated costs, and in some embodiments, can determine the most cost effective mitigation strategy to utilize.

In some embodiments, after receiving the calculation output 213, the impact output 215, and the cost output 217, the mitigation decision module 204 can determine if there is a need to initiate a mitigation protocol (e.g., has a bit-flip probability threshold been met or exceed?). If the mitigation decision module 204 determines that a mitigation protocol should not be initiated, the system 200 can periodically (e.g., in another 30 days, or continuously) restart the steps described here in FIG. 2.

If the mitigation decision module 204 determines that a mitigation protocol should be initiated, the mitigation decision module 204 can generate the decision output 219, which can indicate that the system 200 that is located in Boulder, Colo. should have services migrated "from location 1 (e.g., Boulder, Colo.) to location 2 (e.g., New Orleans, La. where the elevation is lower, etc.)."

The decision output 219 can then be sent, in some embodiments, with a ranked list of applications to be protected (e.g., based on the bit-flip tolerance as previously discussed above) and the mitigation strategy (protection protocol) to the mitigation orchestration module 206. Upon receiving the decision output 219, the mitigation orchestration module 206 can enact the mitigation strategy to protect the selected applications in the system 200.

Figure 3:
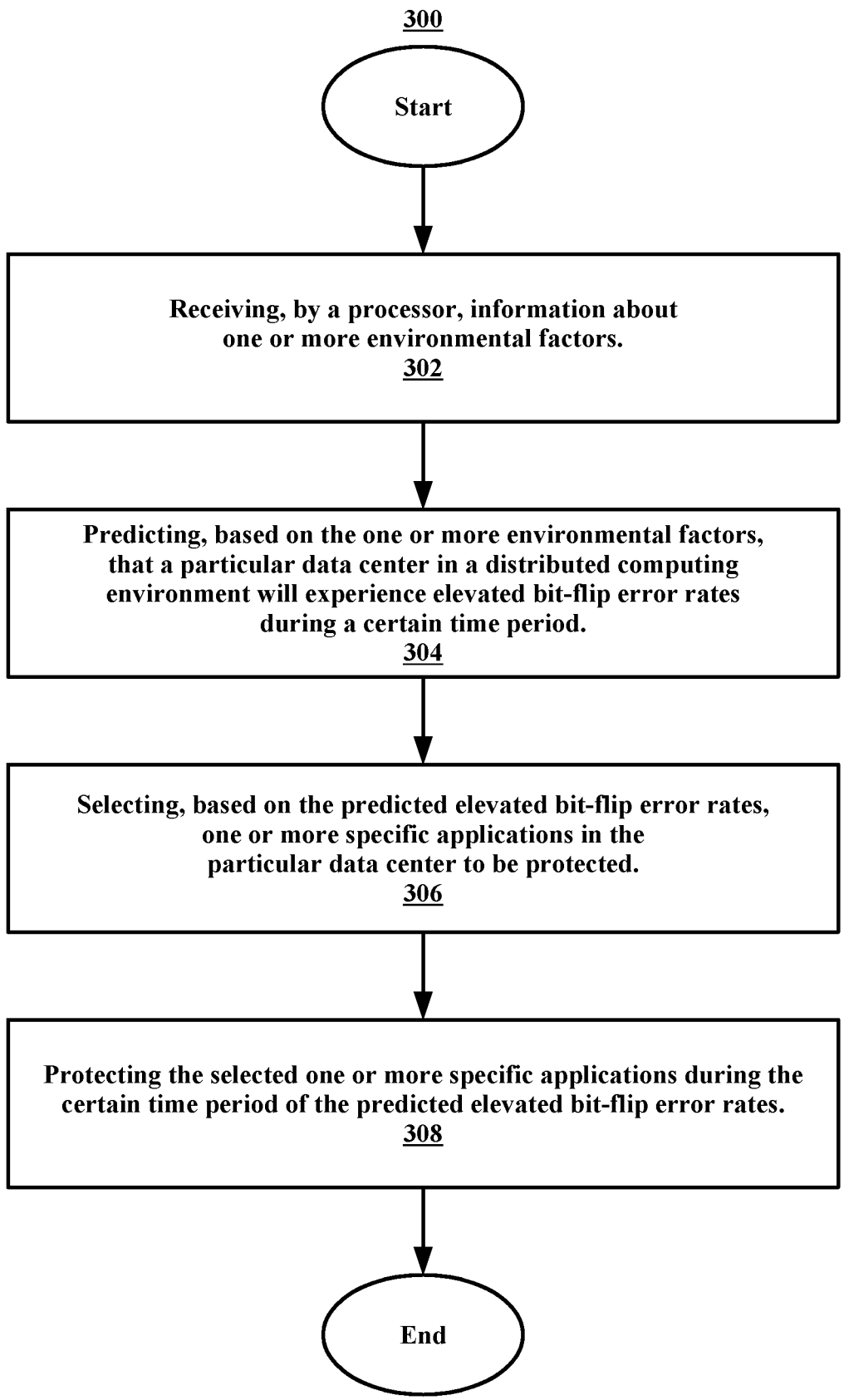
FIG. 3 illustrates a flowchart of an example method for protecting one or more applications during a time period predicted to have elevated bit-flip error rates, in accordance with embodiments of the present disclosure.

Referring now to FIG. 3, illustrated is a flowchart of an example method 300 for protecting one or more applications during a time period predicted to have elevated bit-flip error rates, in accordance with embodiments of the present disclosure. In some embodiments, the method 300 is performed by a processor (in a datacenter/system/etc.)

In some embodiments, the method 300 begins at operation 302. At operation 302 a processor receives information about one or more environmental factors. The method 300 proceeds to operation 304. At operation 304 the processor predicts, based on the one or more environmental factors, that a particular data center in a distributed computing environment will experience elevated bit-flip error rates during a certain time period.

The method 300 proceeds to operation 306. At operation 306, the processor selects, based on the predicted elevated bit-flip error rates, one or more specific applications in the particular data center to be protected. The method 300 proceeds to operation 308. At operation 308, the processor protects the selected one or more specific applications during the certain time period of the predicted elevated bit-flip rates. In some embodiments, after operation 308 the method 300 ends.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
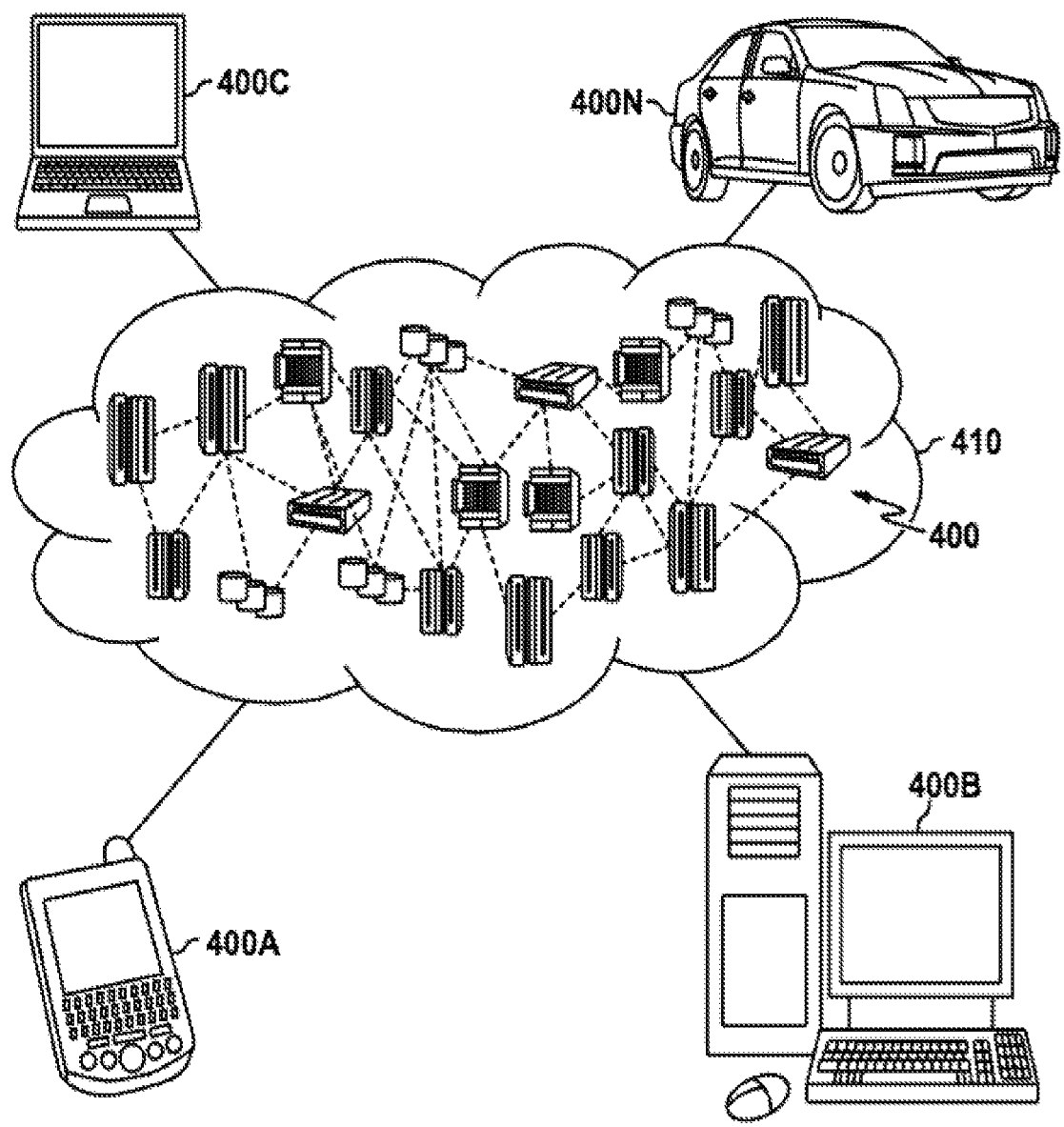
FIG. 4 depicts a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
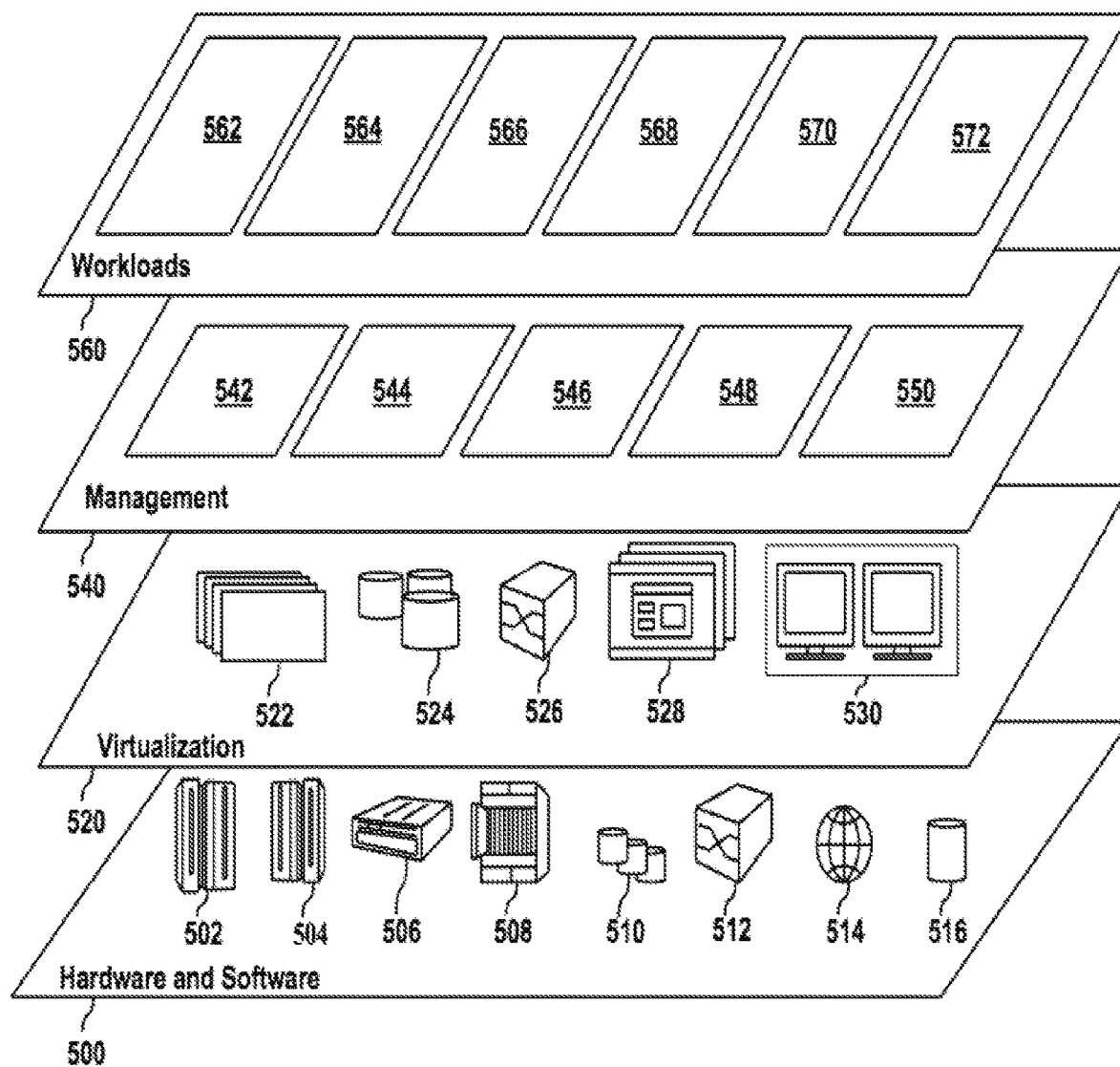
FIG. 5 depicts abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the disclosure are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and bit-flip protection processing 572.

Figure 6:
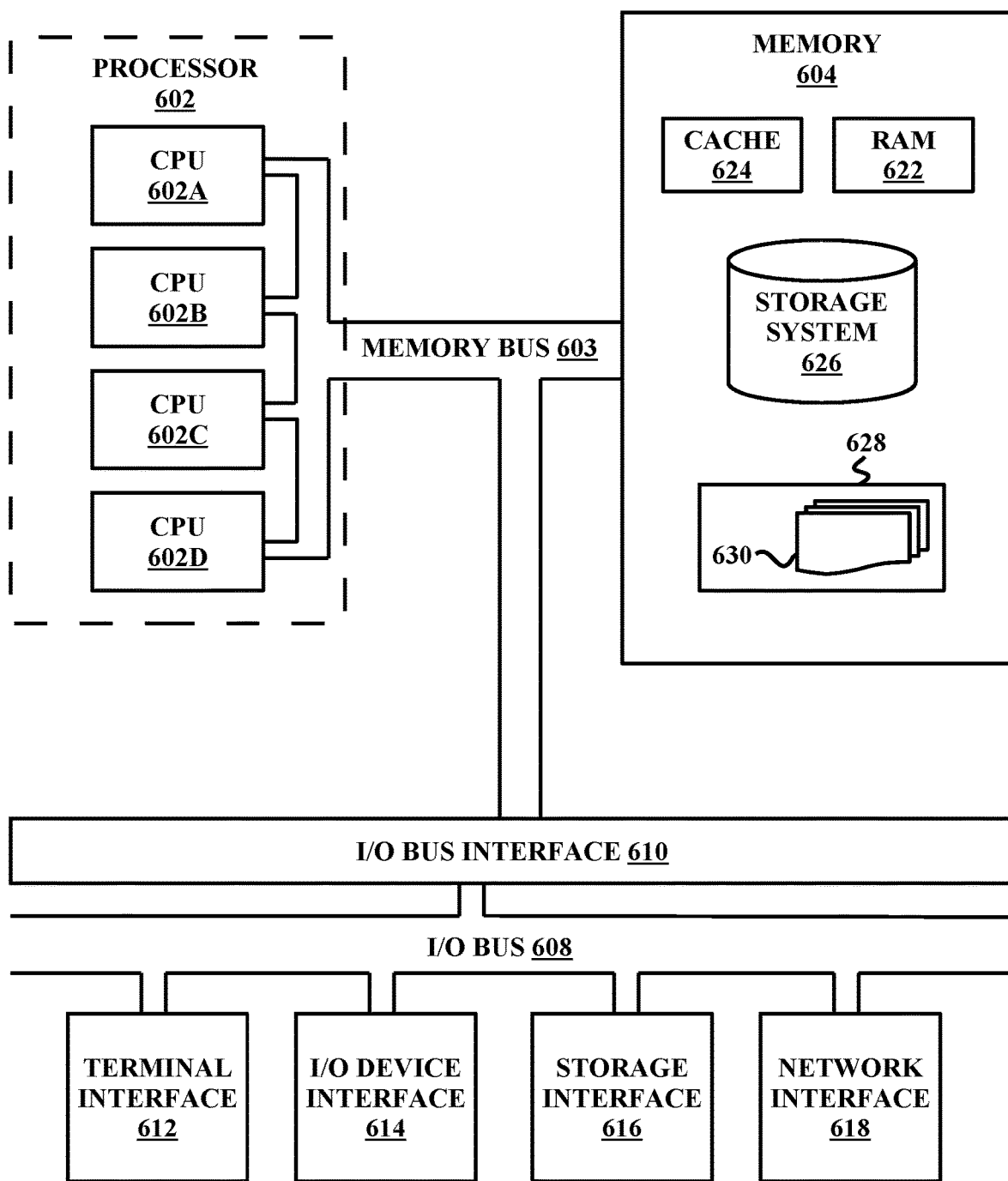
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
   receiving, by a processor, information about one or more environmental factors;
   predicting, based on the one or more environmental factors, that a particular datacenter in a distributed computing environment will experience elevated bit-flip error rates during a certain time period;
   selecting, based on the predicted elevated bit-flip error rates, one or more specific applications in the particular datacenter to be protected; and
   protecting the selected one or more specific applications during the certain time period of the predicted elevated bit-flip error rates, wherein protecting the selected one or more specific applications includes:
      identifying a second datacenter in the distributed computing environment, wherein the second datacenter is determined to have a lower bit-flip error rate during the certain time period,
      transferring the selected one or more specific applications to the second datacenter, and
      receiving the selected one or more specific applications back from the second datacenter after the certain time period.

2. The method of claim 1, wherein the one or more environmental factors include elevation, temperatures, voltage spikes, and solar flares.

3. The method of claim 1, wherein the one or more specific applications are selected to be protected based on a determined threshold level of the predicted elevated bit-flip error rates being exceeded.

4. The method of claim 1, wherein the one or more specific applications are selected to be protected based on respective bit-flip error tolerances of each of the one or more specific applications, wherein the selected one or more specific applications are identified as having a bit-flip error tolerance below a tolerance threshold.

5. The method of claim 1, wherein the one or more specific applications are selected to be protected based on a priority level automatically set by the particular datacenter, wherein the priority level is associated with a user input, and wherein the user input indicates a preference for each of the one or more specific applications.

6. The method of claim 1, wherein protecting the selected one or more specific applications further comprises:
   replicating each of the selected one or more specific applications, wherein the selected one or more specific applications being replicated are classified as originals;
   storing each of the replicas in a different location within the particular datacenter;
   generating an indication of the locations of each of the replicas;
   selecting, after the certain time period, an uncorrupted version of each of the one or more specific applications from the originals and the replicas; and
   deleting the originals and the replicas that were not selected from the particular datacenter.

7. A system comprising:
   a memory; and
   a processor in communication with the memory, the processor executing instructions contained within the memory in order to perform operations comprising:
   receiving information about one or more environmental factors;
   predicting, based on the one or more environmental factors, that a particular datacenter in a distributed computing environment will experience elevated bit-flip error rates during a certain time period;
   selecting, based on the predicted elevated bit-flip error rates, one or more specific applications in the particular datacenter to be protected; and protecting the selected one or more specific applications during the certain time period of the predicted elevated bit-flip error rates, wherein protecting the selected one or more specific applications includes:
- identifying a second datacenter in the distributed computing environment, wherein the second datacenter is determined to have a lower bit-flip error rate during the certain time period,
- transferring the selected one or more specific applications to the second datacenter, and
- receiving the selected one or more specific applications back from the second datacenter after the certain time period.

8. The system of claim 7, wherein the one or more environmental factors include elevation, temperatures, voltage spikes, and solar flares.

9. The system of claim 7, wherein the one or more specific applications are selected to be protected based on a determined threshold level of the predicted elevated bit-flip error rates being exceeded.

10. The system of claim 7, wherein the one or more specific applications are selected to be protected based on respective bit-flip error tolerances of each of the one or more specific applications, wherein the selected one or more specific applications are identified as having a bit-flip error tolerance below a tolerance threshold.

11. The system of claim 7, wherein the one or more specific applications are selected to be protected based on a priority level automatically set by the particular datacenter, wherein the priority level is associated with a user input, and wherein the user input indicates a preference for each of the one or more specific applications.

12. The system of claim 7, wherein protecting the selected one or more specific applications further comprises:
- replicating each of the selected one or more specific applications, wherein the selected one or more specific applications being replicated are classified as originals;
- storing each of the replicas in a different location within the particular datacenter;
- generating an indication of the locations of each of the replicas;
- selecting, after the certain time period, an uncorrupted version of each of the one or more specific applications from the originals and the replicas; and
- deleting the originals and the replicas that were not selected from the particular datacenter.

13. A computer program product comprising a computer readable storage medium having program instructions embodied therewith, the program instructions executable by a processor to cause the processor to perform a method, the method comprising:
- receiving information about one or more environmental factors;
- predicting, based on the one or more environmental factors, that a particular datacenter in a distributed computing environment will experience elevated bit-flip error rates during a certain time period;
- selecting, based on the predicted elevated bit-flip error rates, one or more specific applications in the particular datacenter to be protected; and
- protecting the selected one or more specific applications during the certain time period of the predicted elevated bit-flip error rates, wherein protecting the selected one or more specific applications includes:
  - identifying a second datacenter in the distributed computing environment, wherein the second datacenter is determined to have a lower bit-flip error rate during the certain time period,
  - transferring the selected one or more specific applications to the second datacenter, and
  - receiving the selected one or more specific applications back from the second datacenter after the certain time period.

14. The computer program product of claim 13, wherein the one or more environmental factors include elevation, temperatures, voltage spikes, and solar flares.

15. The computer program product of claim 13, wherein the one or more specific applications are selected to be protected based on a determined threshold level of the predicted elevated bit-flip error rates being exceeded.

16. The computer program product of claim 13, wherein the one or more specific applications are selected to be moved protected on respective bit-flip error tolerances of each of the one or more specific applications, wherein the selected one or more specific applications are identified as having a bit-flip error tolerance below a tolerance threshold.

17. The computer program product of claim 13, wherein the one or more specific applications are selected to be protected based on a priority level automatically set by the particular datacenter, wherein the priority level is associated with a user input, and wherein the user input indicates a preference for each of the one or more specific applications.

18. The computer program product of claim 13, wherein protecting the selected one or more specific applications further comprises:
- replicating each of the selected one or more specific applications, wherein the selected one or more specific applications being replicated are classified as originals;
- storing each of the replicas in a different location within the particular datacenter;
- generating an indication of the locations of each of the replicas;
- selecting, after the certain time period, an uncorrupted version of each of the one or more specific applications from the originals and the replicas; and
- deleting the originals and the replicas that were not selected from the particular datacenter.

* * * * *